United States Patent [19]

Bingen

[11] 4,176,237
[45] Nov. 27, 1979

[54] FOUR A INDUCTION

[75] Inventor: Roald Bingen, Marcinelle, Belgium

[73] Assignee: Ateliers de Constructions Electriques de Charleroi (ACEC), Charleroi, Belgium

[21] Appl. No.: 873,843

[22] Filed: Jan. 31, 1978

[30] Foreign Application Priority Data

Feb. 1, 1978 [BE] Belgium .................................. 17916

[51] Int. Cl.² .............................................. H05B 5/16
[52] U.S. Cl. .................................... 13/27; 174/15 C; 336/187; 336/188
[58] Field of Search ...................... 13/26, 27; 336/186, 336/187, 188; 174/15 C, 16 B, 117 R, 117 F

[56] References Cited

U.S. PATENT DOCUMENTS

| | | | |
|---|---|---|---|
| 1,823,908 | 9/1931 | Long | 13/26 |
| 1,861,870 | 6/1932 | Long | 13/27 X |
| 3,563,850 | 2/1971 | Stackhouse et al. | 174/117 R UX |

Primary Examiner—Roy N. Envall, Jr.
Attorney, Agent, or Firm—Schwartz, Jeffery, Schwaab, Mack, Blumenthal & Koch

[57] ABSTRACT

The present invention concerns an induction furnace. It is the object of the invention to increase the power of such furnaces while maintaining their weight or space requirements, or, to reduce their weight or space requirements for a given power, or further to design machines more powerful than those known at the present time. There exist at this time crucible induction furnaces designed for a capacity of approximately 30 t of cast iron. The invention permits the adaptation of such a furnace to melt not case iron, but steel and to increase the capacity of said furnace to a higher order of magnitude, for example 100 t or more. To enable the furnace to satisfy the requirements of steel making, the invention also provides for an increase in specific power, presently limited to approximately 300 kW/t.

9 Claims, 18 Drawing Figures

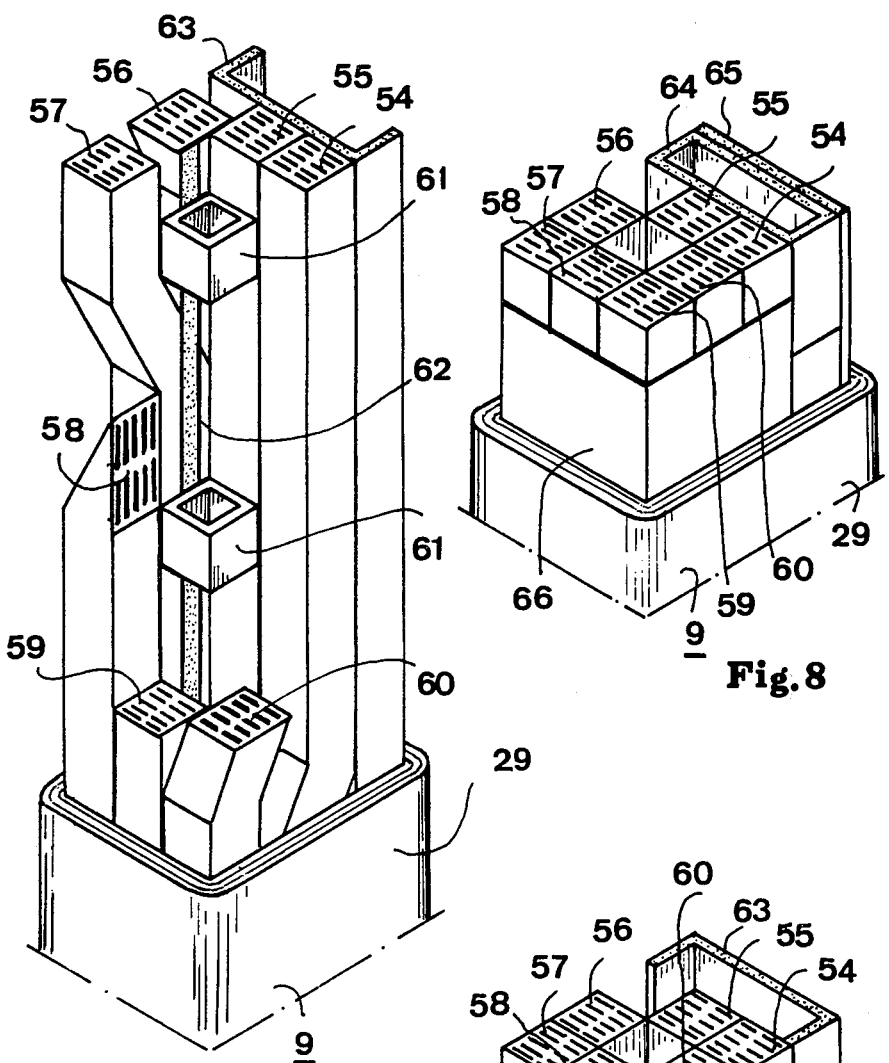
Fig.7
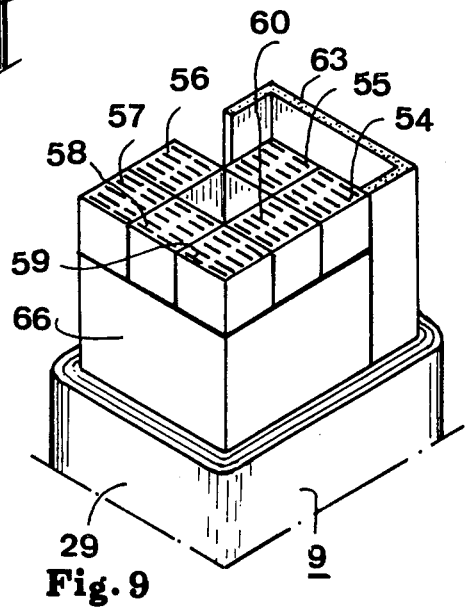
Fig.8
Fig.9

FOUR A INDUCTION

According to the invention, an induction furnace equipped with one or several coils, each supplied by a source of current with a predetermined frequency, is characterized by the fact that the conductor forming the windings of at least one coil consists of several strands of insulated elementary conductors, placed in parallel and at least one conduit of a cooling fluid and that the strands, with or without the conduit, are twisted among themselves, preferably by successive transposition, while leaving parallel the faces of each strand after the transposition and by that the elementary conductors of each strand have rectangular cross sections and are twisted between themselves by successive transposition, so as to always present their greater width parallel to the axis of the coil.

Other characteristics of the invention will appear in the following description of an example of one form of embodiment of the invention as represented in the drawing. The different figures of the drawing represent the following:

FIG. 1, a front elevation with several sections of a crucible induction furnace according to the invention;

FIG. 2 a plan view, partially in section, of the furnace according to FIG. 1;

FIG. 3 a section of a composite conductor having low coil losses of a furnace according to FIG. 1;

FIGS. 4–9 are variations of FIG. 3;

Figure 1:
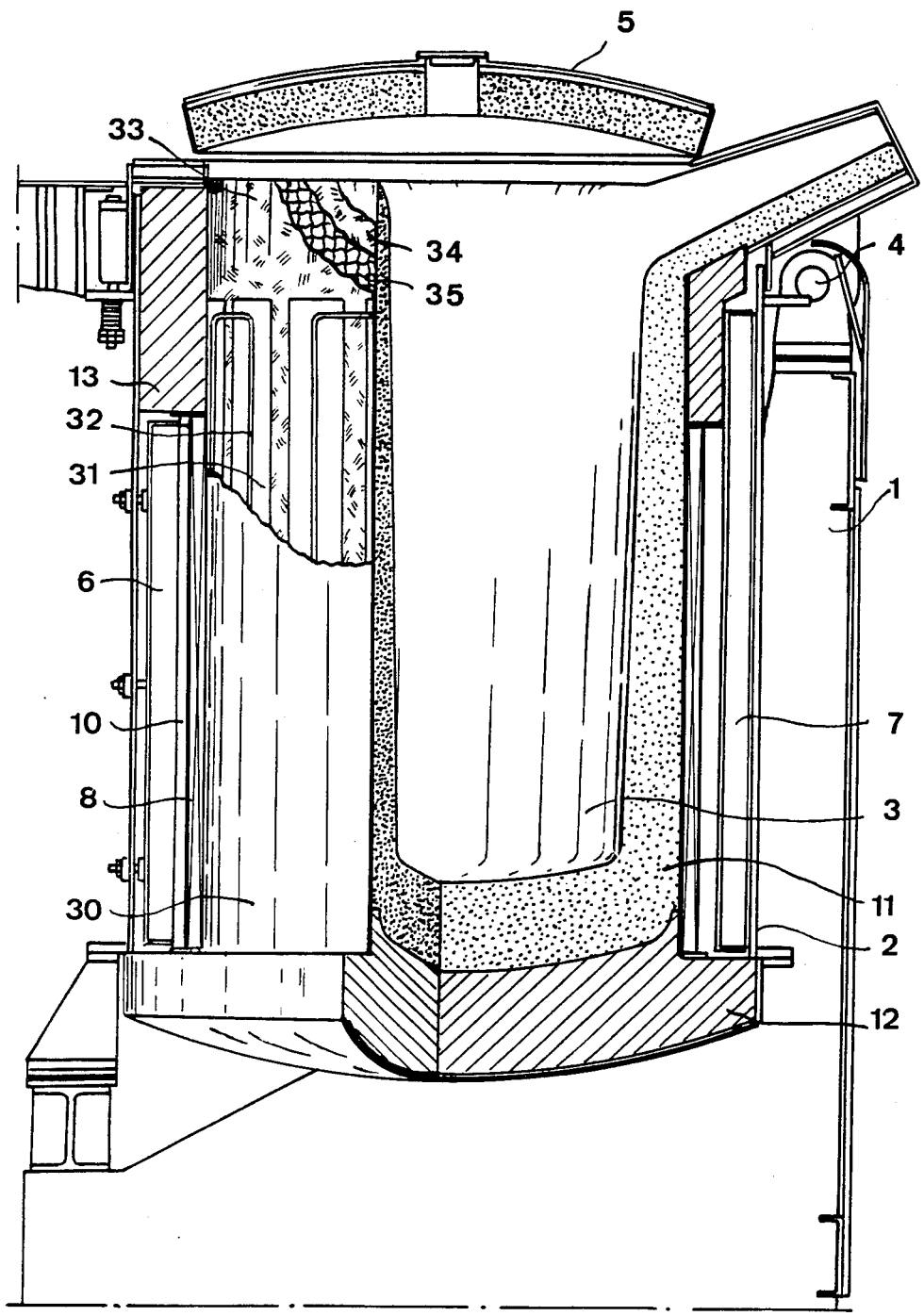
Figure 2:
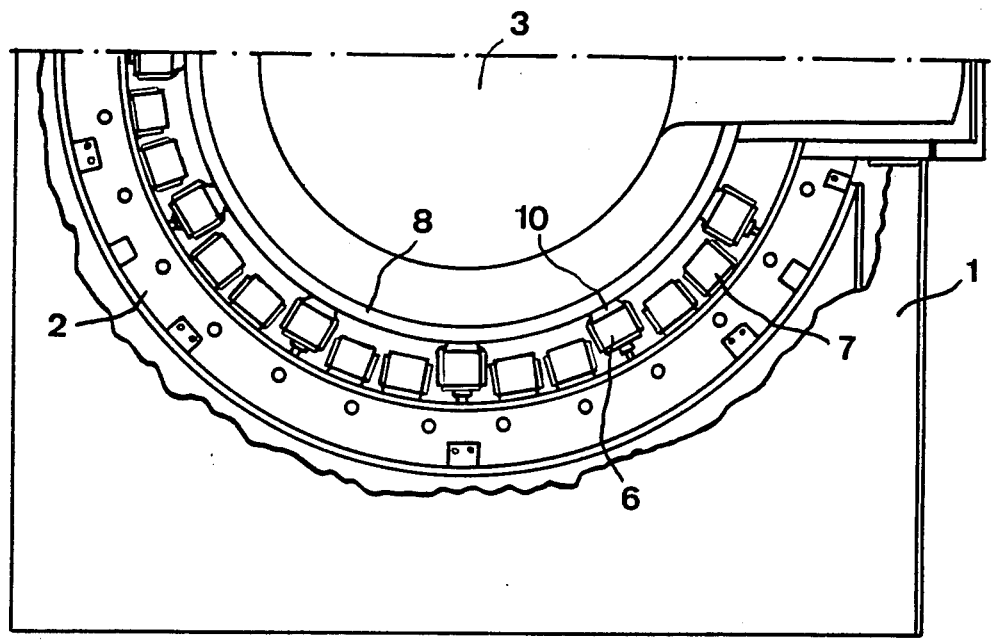

In FIG. 1, in a frame 1, a support 2 for a crucible 3 is contained, said crucible being pivotable around an axis 4, which is integral with the frame 1. The crucible 3 is topped with a cover 5, the activating mechanism of which is not shown. The support 1 shelters the bars of the magnetic circuit 6 and 7 which consists of sheet metal piles and is located along the cylindrical enclosure of the support 2. An induction coil 8 consists either of a single section or it may be composed of several partial coils; the details of the connection of said coil with a source of current of predetermined frequency are not shown. The induction coil 8 comprises, preferably, a single layer of windings in a composite conductor 9. The bars of the magnetic circuit 6 are faced with wooden ties 10 against which the composite conductor 9 of the induction coil 8 rests. Inside the induction coil 8, the crucible 3 is constructed of refractory material 11. Certain parts of the crucible are made of refractory cement 12 or chamotte bricks 13.

Figure 3:
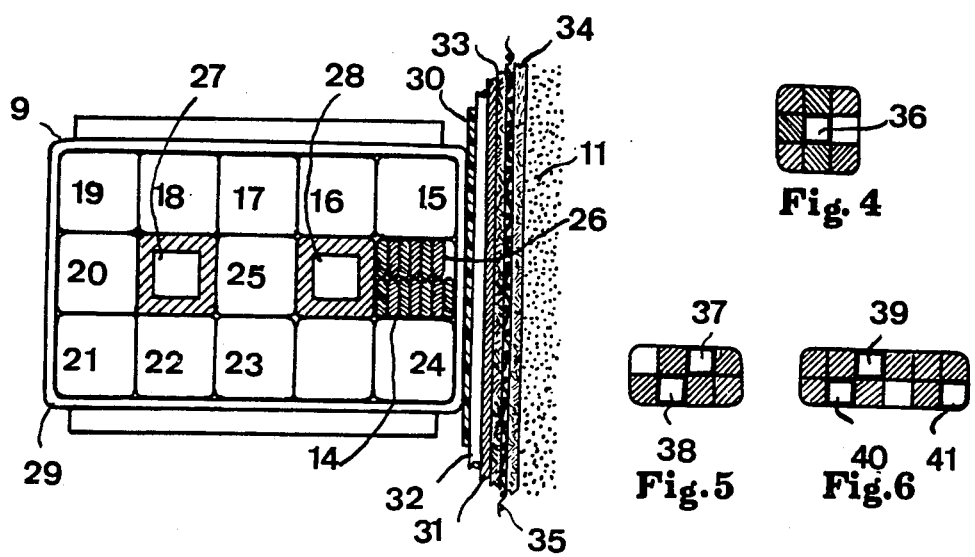

A composite conductor 9 forming the windings of the induction coil, is shown in section at an enlarged scale in FIG. 3. FIG. 3 is also a partial section of the induction coil 8, because the latter comprises only a single layer of windings. The conductor 9 consists of the strands 14 to 25 of the elementary conductors 26, assembled with thin tape. The elementary conductors 26 are placed in parallel and insulated, for example with fiber glass, not shown. Inside the conductor 9 a core cooled by a cooling liquid, water in this instance, is placed, said core consisting of the strand 25 and two thin-walled tubes 27 and 28 which do not conduct the current of the coil. The tubes 27 and 28 may be made of copper, or, preferably, of a non-magnetic metal which is a poor electrical conductor and a good conductor of heat or of a composite magnetic material, which is both a conductor and an insulator. The strands 14 to 24 are twisted around the cooled core by successive transposition. The elementary conductors 26 are of a rectangular cross section and twisted among themselves by successive transposition in a manner known in itself from ROEBEL conductors. Care must be taken that each elementary conductor 26 of each strand presents its larger width parallel to the axis of the induction coil 8. This is necessary, because the lines of the magnetic field generated by the coil are approximately parallel to the axis of the coil 8. In addition, the rectangular section of each elementary conductor 26 has a maximum dimension of the order of magnitude of the depth of penetration, by the skin effect, of the current in the metal of the conductor, at the frequency of the source of power. The depth of penetration in copper at a frequency of 50 Hz is of the order of magnitude of 10 mm, so that for that frequency, e.g. copper conductors with sections of $2.5 \times 8$, $3 \times 10$, $4 \times 12$ (all mm) or of intermediate sections, may be chosen without having to fear difficulties arising from the skin effect or encountering excessive costs in the manufacture of the composite conductor 9. In the present case, the conductor shown in cross section in FIG. 3 consists of 156 elementary conductors and is capable of carrying altogether a current of the order of magnitude of 20 to 30,000 Amperes at the industrial frequency of 50 Hz. The composite conductor 9 is surrounded by a sheathing 29 of high mechanical strength, e.g. several layers of fiber glass and is impregnated so that all voids are filled by a hardenable composition. Such a conductor 9 has minimal losses and does not generate vibrations, inspite of the enormous currents it is called upon to carry.

Inside the coil 8, are placed a sheet of insulting cardboard in one of several layers, and strips of copper foil 31 welded to the cooling tubes 32 parallel to the axis of the coil 8. The strips of copper foil are covered with two asbestos millboards 33 and 34, enclosing between them a wire net 35, intended to serve as a probe for the detection of penetrations of the refractory 11.

Figure 4:
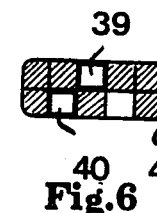

It is obviously possible to conceive of other forms of the conductor 9, differing from that displayed in FIG. 3. The conductor of FIG. 4 comprises a cooled core consisting only of a cooling tube 36. If the tube 36 is made of copper, it may participate in the conduction of the current of the coil, with the result that the increased losses are compensated for by improved cooling due to the excellent thermal conductivity of copper.

Figures 5, 6:
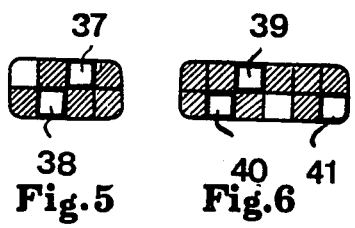

The conductors shown in FIGS. 5 and 6 do not contain a cooled core, but the tubes for the cooling liquid 37, 38 and 39, 40, 41 are made of copper, take part in the conduction of the current and are twisted with the strands of elementary conductors by successive transportation.

The combination of the conductor 9 with a system for cooling the crucible directly such as achieved with the aid of the strips 31 and the tubes 32 improve the durability of the insulation of the conductor 9 and permits a decrease in the thickness of the refractory lining 11, with the result of providing better coupling between the charge in the crucible 3 and the coil 8.

It is possible to replace the tubes for the cooling liquid by short tube sections placed one after the other with a considerable space between successive sections. Composite conductors 9 of this type are shown in FIGS. 7, 8 and 9 in partially sectioned perspective views. Short tube sections 61 are placed inside a conductor 9 of the general design of FIG. 4 which is composed of the strands 54 to 60. For ease of manufacture, the sections 61 may be secured with a tape 62 leading in a straight line to the interior of the assembly of insulated strands 54 to 60. The sections 61 serve as spacers for said strands. In this manner, the conduit for the cooling liquid is formed by the strands 54 to 60 and made impermeable by the outer sheating 29 of fiber glass impregnated by a hardenable resin composition, e.g. based on epoxy resin.

In order to prevent the clogging of the conduit for the cooling fluid by the impregnated resin, said conduit is flushed with compressed air before and possibly during the initial phase of the polymerization of the impregnating resin.

Instead and in place of the cooling tubes 32 welded to copper foil 31, placed in contact with the refractory and shown in FIG. 1, it is possible to equip the coil with a supplementary water conduit, placed next to the refractory. This water conduit may consist of a flat tube, a U shape 63 such as shown in FIGS. 7 and 8 or a succession of sections 64 following a tape 65, e.g. of bakelike coated paper, such as shown in FIG. 9. If an embodiment according to FIGS. 8 and 9 is chosen, it is possible to prevent communication between the flat conduit and the conduit defined by the sections 61 by means of a very fine (cotton) insulation 66, surrounding the strand assembly 54 to 60 and impregnated by a suitable hardenable resin. In all of the cases shown in FIGS. 7, 8 and 9, the flat conduit is completely enclosed by the outer sheating 29 of the composite conductor 9.

It should also be noted that the strands of elementary conductors may be subdivided into intermediate assemblies defined for example by the thin taping of the assembled strands and twisted by transposition in these intermediate assemblies. After this, the intermediate assemblies may again be twisted by successive transposition. This subdivision may be repeated several times, depending on the number of elementary conductors constituting the composite conductor. It is of advantage not to exceed approximately 32 conductors per strand or 16 strands of water conduits per intermediate assembly or 16 intermediate assemblies per composite conductor. In fact, manufacturing difficulties increase more than proportionally with the number of elements assembled in strands, intermediate assemblies or composite conductors.

In order to facilitate maximum heat exchange between the cooling conduit and the elementary conductors of the electric current of the strands of a composite conductor, the conduit of the cooling liquid is placed at the side perpendicular to the greater width of the elementary conductors. If such a composite conductor is employed to form the layers of the coil of an induction furnace, the strands are placed in layers perpendicular to the axis of the coil and each layer of strands is adjacent to a conduit of cooling liquid also placed in a layer perpendicular to the axis of the coil.

Figure 10:
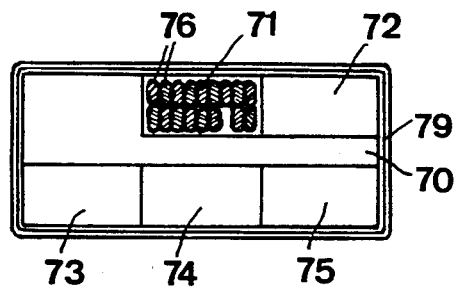
FIGS. 10, 11, 12 and 15 are sections of composite conductors.

Some examples of variants of cooling using composite conductors of this type are described in the following:

FIG. 10 displays a transverse section of a composite conductor. This conductor, which is assumed to form part of the winding of an induction coil in a single axial layer, contains an odd number of strands 71 to 75, obtained by the transposition of individual conductors 76, placed in the filed. Strands 71 and 72 on the one hand, and 73, 74, 75 on the other hand, form layers perpendicular to the axis of the coil. Between these two layers of strands a conduit of a cooling liquid 70 is placed, again in a layer perpendicular to the axis of the coil. The entire assembly is surrounded by an external sheathing 79. In this manner, the number of layers of insulation between the elementary conductors and the cooling liquid conductor is a maximum of two, providing optimum heat exchange. Because the strands are placed freely, their transposition of the strands can be achieved readily by crossing the cooling liquid conduit.

Figure 11:
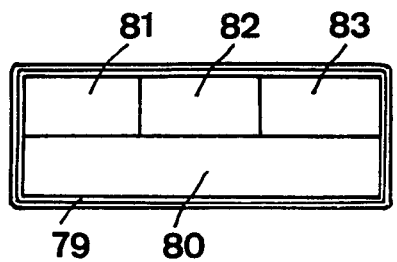
Figure 12:
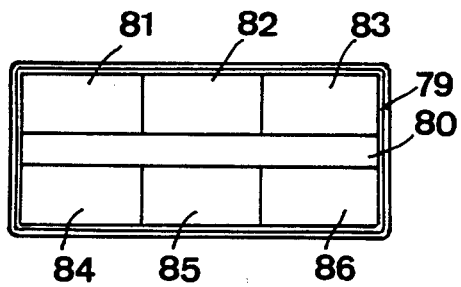

FIGS. 11 and 12 show two transverse sections of composite conductors, in which the layers of the strands are adjacent to the conduits of the cooling liquid 80, placed in layers perpendicular to the axis of the coil. While in FIG. 11 a single layer of strands is shown, FIG. 12 represents a variant comprising two layers of strands 81 to 83 and 84 to 86, adjacent to a single conduit of the cooling liquid. The thickness of the cooling liquid conduit 80 of FIG. 11 is shown to be the same as the thickness of the layer of strands 81 to 83 or 84 to 86. Transposition of the conductors 81 to 86 is thus not possible under these conditions. However, if the transposition of the strands 81 to 86 is to be performed only after each winding or even after both windings, it is sufficient to enlarge the conduit 80 to the thickness necessary for a length sufficient for transposition. The effect of such a measure on the coiling of a furnace is shown by the development of part of the coiling, for transposition after each winding in FIG. 13 and for a transposition of both windings in FIG. 14.

Figure 13:
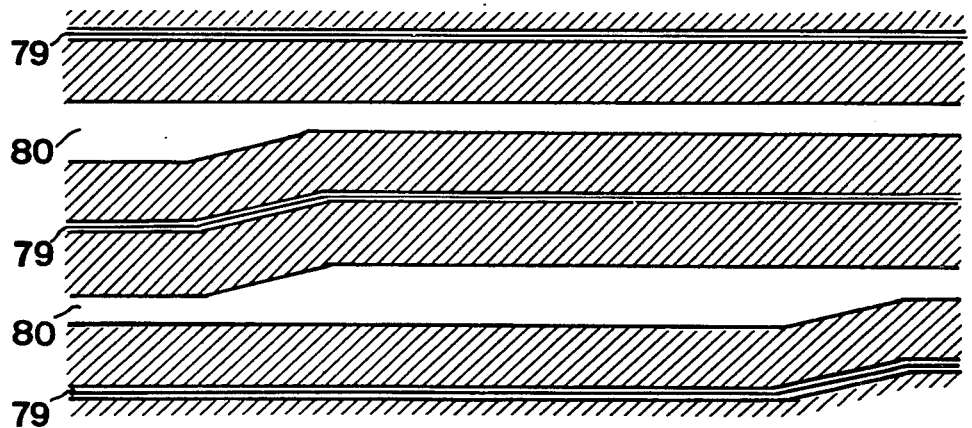
FIGS. 13 and 14 are developments of parts of coils.
Figure 14:
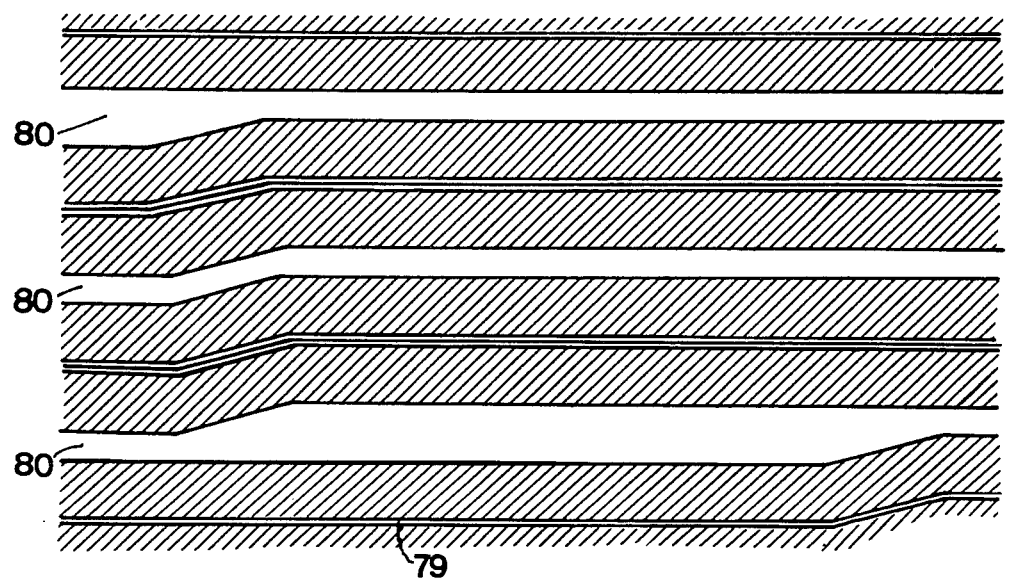

It is seen in FIGS. 13 and 14 that in this case, the large widths of the liquid conductor 80 occur successively from winding to winding.

Figure 15:
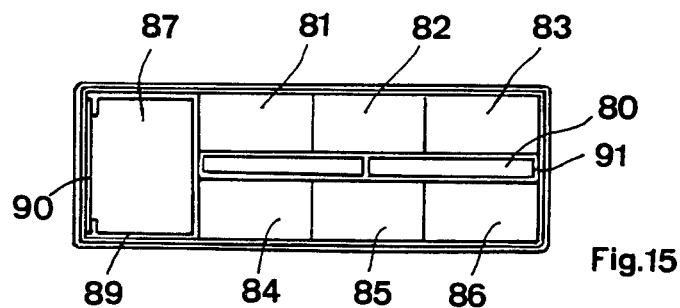
Figure 16:
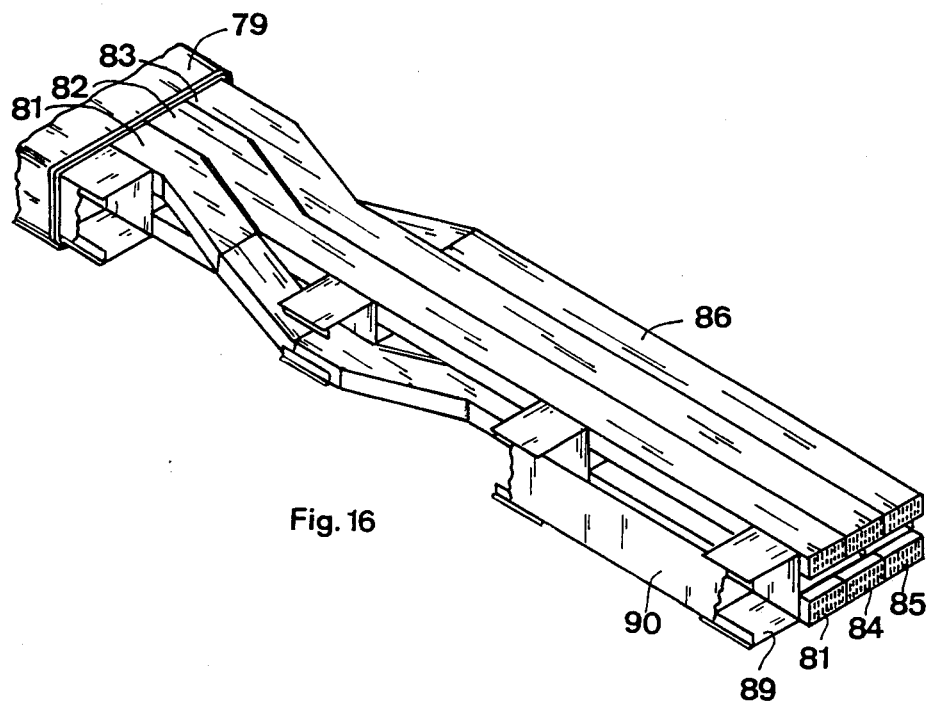
FIGS. 16 to 18 are perspective views of a part of a coil and the spacers for that coil.

If, in accordance with FIG. 15, the composite conductor of FIG. 12 is accompanied by the enlargement of the liquid conduit 87 to the width of at least one of the strands 81 to 86, the transposition may be accomplished averaging a deviation of the strands in the enlargement 87, for example as shown in perspective in FIG. 16.

Figure 17:
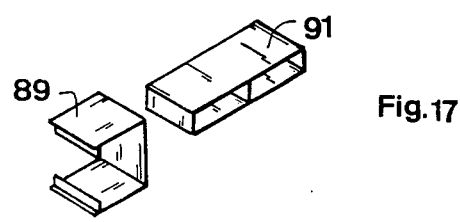

In FIG. 16, the external sheating 79 of the composite conductor has been removed and an example of the spacer 88 is also shown, said spacer permitting the convenient manufacture of the composite conductor. According to FIG. 17, the spacer 88 comprises on the one hand a U shape 89 with clips, said U shape defining with the aid of a rigid tape 90, engaged in the clips, the space of the enlargement 87 of the cooling liquid conduit, and on the other, a flat stiffening line 91 of rectangular cross section, which may or may not be integral with the U shape 89. In the winding of the coiling of an induction furnace, the enlargement 87 is located outside, at the side opposite to the crucible.

Figure 18:
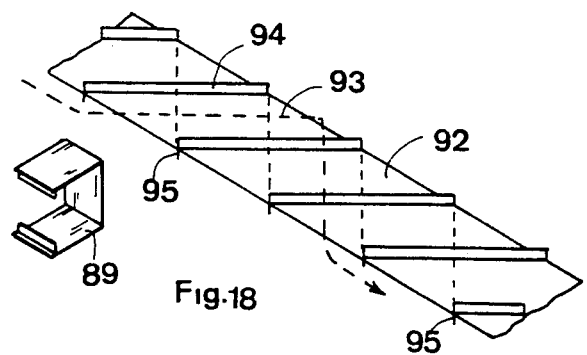

FIG. 18 displays another embodiment of spacing for the arrangement shown in FIG. 16, comprising on the one hand U shapes with clips 89 and on the other an angled strip 92 which conducts the cooling liquid along a helical trajectory 93 in the space between the two layers of strands 81 to 86.

I claim:

1. An induction furnace having at least one coil connected to a source of alternating current of a predetermined frequency and wherein the coil is constituted by at least one loop of a composite conductor and at least a conduit of cooling liquid, characterized by the fact that said composite conductor is constituted by strands of elementary conductors twisted between themselves by parallel transposition and the said strands being twisted by parallel transposition around said at least one conduit of cooling liquid.

2. Induction furnace according to claim 1, characterized by the fact that the cooling conduit consists of a U-shape of an insulating material, enclosed by the outer sheating of the composite conductor of the coil.

3. An induction furnace having at least one coil connected to a source of alternating current of a predetermined frequency wherein the coil is constituted by at least one loop of a composite conductor constituted by strands of elementary conductors twisted between themselves by parallel transposition and the said strands being twisted by parallel transposition around at least one conduit of cooling liquid constituted by a succession of spacers placed one after the other with spaces between successive spacers and by an outer sheating of the said composite conductor.

4. Induction furnace according to claim 3, characterized by the fact that the cooling conduit consists of spacers connected by a rigid band and enclosed by the outer sheating of the composite conductor of the coil.

5. Induction furnace according to claim 3, characterized by the fact that conduit for the liquid has enlarged parts in which the transposition of the strands takes place.

6. Induction furnace according to claim 5, characterized by the fact that the enlarged part of the liquid conduit constitutes a lateral enlargement.

7. Induction furnace according to claim 5, characterized by the fact that the enlarged parts are superimposed in steps following the winding of the layers of the coil.

8. Induction furnace according to claim 3, characterized by the fact that the spacers contain flat rigidizing links.

9. Induction furnace according to claim 3, characterized by the fact that the spacers comprise a horizontal strip angles perpendicularly, said strip being oblique in one direction on one side of the strip and oblique in the other direction on the other side of the strip.

* * * * *